Figure 2:
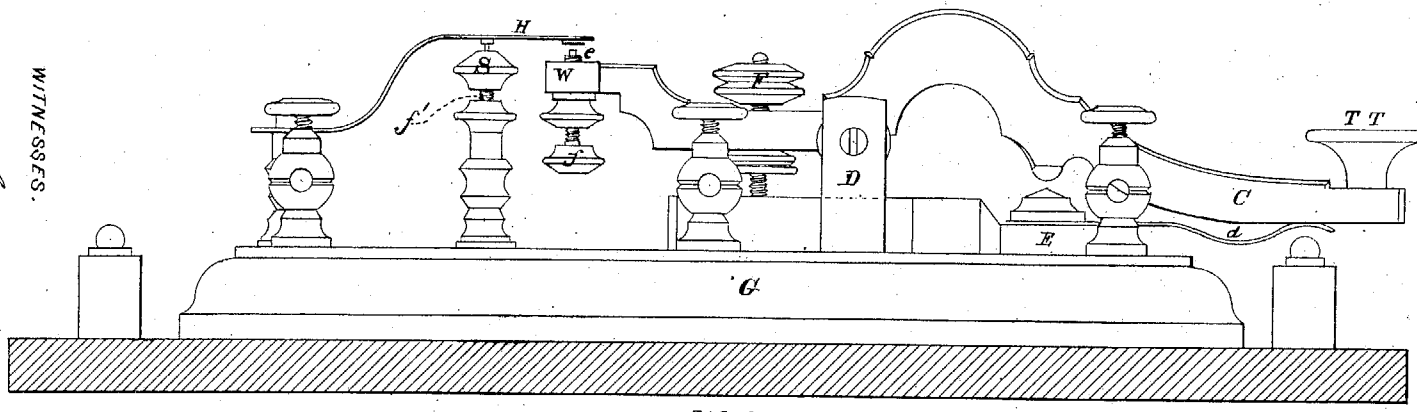

4 Sheets--Sheet 1.

M. G. FARMER.

Method of Sending and Receiving Messages Simultaneously over the Same Telegraph-Wire.

No. 6,296. Reissued Feb. 16, 1875.

WITNESSES.

Sarah J. Farmer

Charles Howell

INVENTOR.

Moses G. Farmer

N. PETERS, Photo-Lithographer, Washington, D. C.

4 Sheets--Sheet 2.

M. G. FARMER.

Method of Sending and Receiving Messages Simultaneously over the Same Telegraph-Wire.

No. 6,296. Reissued Feb. 16, 1875.

WITNESSES.

Sarah J. Farmer

Charles Howell

INVENTOR.

Moses G. Farmer

N. PETERS, Photo-Lithographer, Washington, D. C.

M. G. FARMER.

Method of Sending and Receiving Messages Simultaneously over the Same Telegraph-Wire.

No. 6,296. Reissued Feb. 16, 1875.

WITNESSES.

Sarah J. Farmer.
Charles Stowell

INVENTOR.

Moses G. Farmer.

N. PETERS, Photo-Lithographer, Washington, D. C.

178/58

4 Sheets--Sheet 4.

M. G. FARMER.

Method of Sending and Receiving Messages Simultaneously over the Same Telegraph-Wire.

No. 6,296. Reissued Feb. 16, 1875.

Witnesses.
Sarah J. Farmer
Charles Powell

Inventor.
Moses G. Farmer

THE GRAPHIC CO. PHOTO-LITH. 39 & 41 PARK PLACE, N.Y.

UNITED STATES PATENT OFFICE.

MOSES G. FARMER, OF SALEM, MASSACHUSETTS.

IMPROVEMENT IN METHODS OF SENDING AND RECEIVING MESSAGES SIMULTANEOUSLY OVER THE SAME TELEGRAPH-WIRE.

Specification forming part of Letters Patent No. 21,329, dated August 31, 1858; extended seven years; reissue No. 6,296, dated February 16, 1875; application filed February 18, 1873.

*To all whom it may concern:*

Be it known that I, MOSES G. FARMER, of Salem, in the county of Essex and Commonwealth of Massachusetts, have invented an Improved Apparatus for Transmitting Simultaneously Two Messages over the same Telegraphic Wire, of which the following is a full, clear, and exact description, reference being had to the accompanying drawings, making part of this specification.

In the common mode of working the Morse telegraph for single transmission it is customary to work what is called a closed circuit—that is, a circuit having one or more batteries located at some one or more points in the circuit—and the circuit is kept closed when not in use, so that the operator at any station upon the line may have command of the current when he wishes to transmit a message. This act he performs by alternately opening and closing the circuit by raising and depressing his key, and while so doing every receiving-instrument in the circuit, his own included, responds to the motion of his key; but, if two of the stations should attempt to send messages at the same time, confusion would ensue, for while one station had the main circuit open it would do no good (or, rather, make no signal on the line, if well insulated) for any other station to manipulate his key. As soon, however, as the circuit is closed at all stations except the one transmitting, immediately all the receiving-instruments begin to respond to the working of this single key.

Since the operation of transmitting is usually performed by working the key up and down—the circuit being usually open when the key is up, and closed when it is down—if it be desired to transmit messages simultaneously, say, from the two terminal stations, some means must be provided at each of these terminal stations so that the act of raising the key may not open the main circuit, yet such must be the effect of this operation that this act shall somehow express itself at the other end of the line—that is, somehow affect the receiving-instrument at this distant station—and means must also be provided so that this act of raising or depressing the key at this transmitting-station shall not cause the receiving-instrument at this station to respond to the movements of this key.

I accomplish the desired result in this invention in the following manner: By the use of two coiled wires upon the relay or receiving-instrument, one of which is in the main circuit, and the other in the equating or accessory circuit, as I term it, and by the use of an equating current in the equating coil, I am thus enabled to neutralize the effect of the main current on the relay, so that the working of the key up and down does not cause its associate relay to respond to its movements, as will be hereafter more fully shown.

In the ordinary plan of single transmission the function of the key is simply to open and close the main circuit.

In this plan of double transmission the function of the key is to shift the course of the main circuit from one path to another without opening the main circuit at all. It also performs an additional function, viz., that of opening and closing the accessory circuit. This accessory circuit may be operated by a separate and independent battery, or by a branch of the main battery. In the drawings before us it is represented as operated by a separate accessory or equating battery.

The novelty of the invention lies principally in the key or transmitting device. This instrument is constructed very much as telegraph-keys or circuit-closers ordinarily are, with the exception that it has one or more auxiliary key springs or levers, as represented by H $H^1$ $H^2$ in the drawings.

Figure 1:
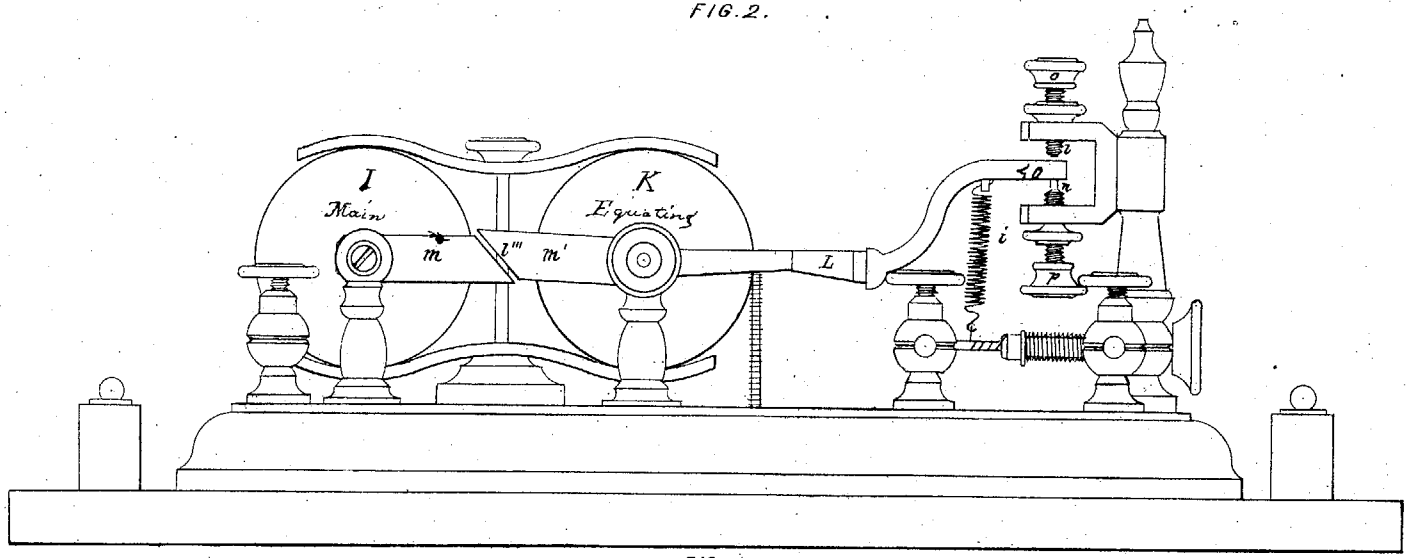
Figure 3:
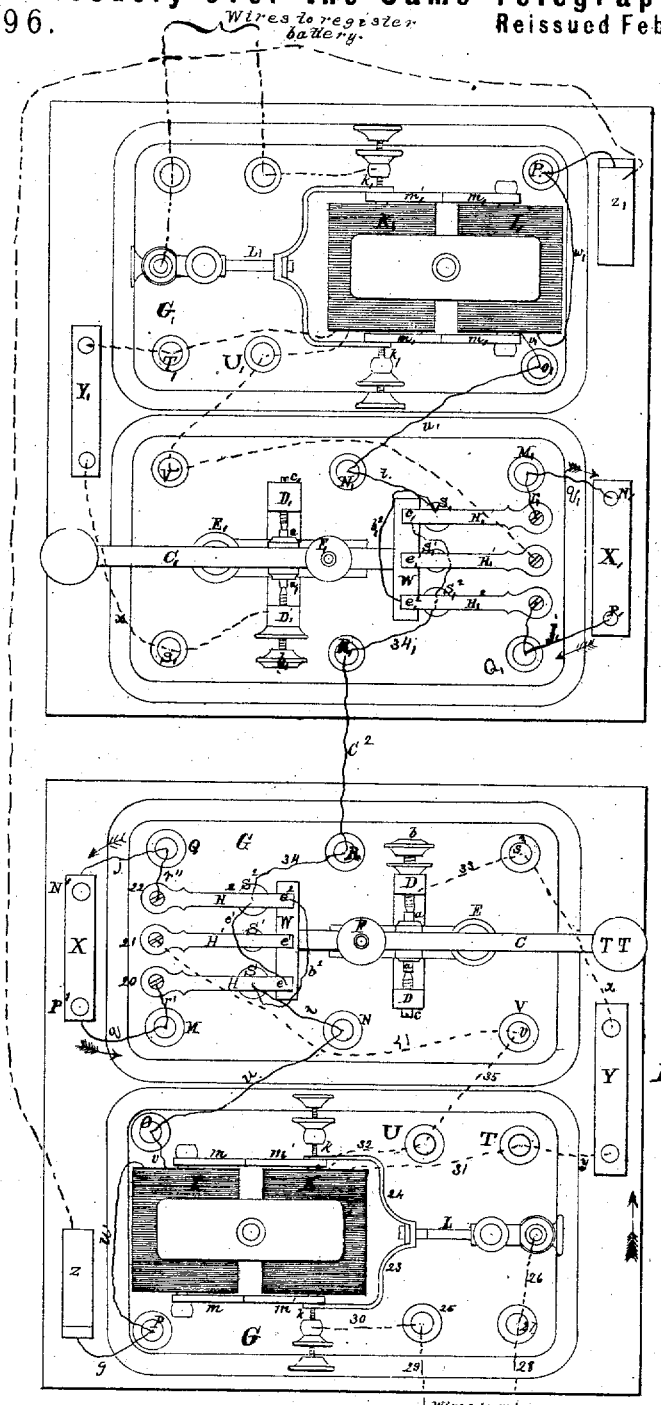
Figure 4:
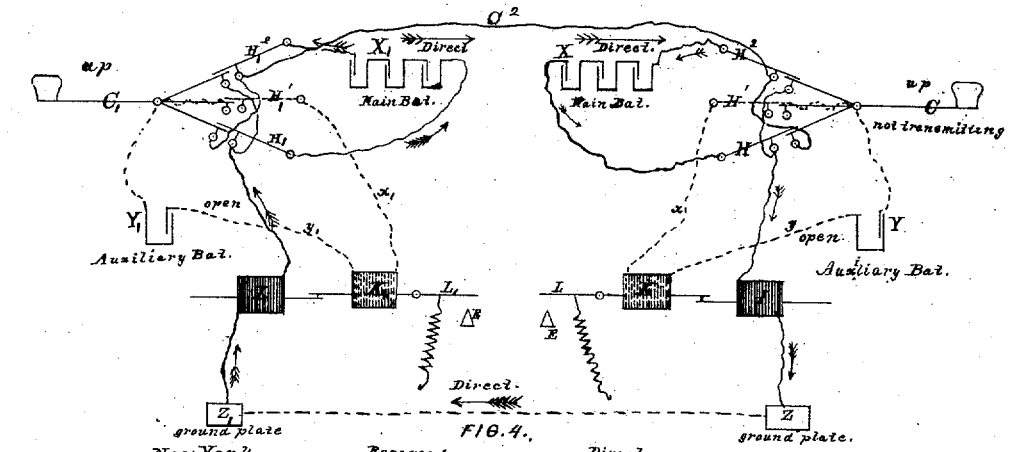
Figure 5:
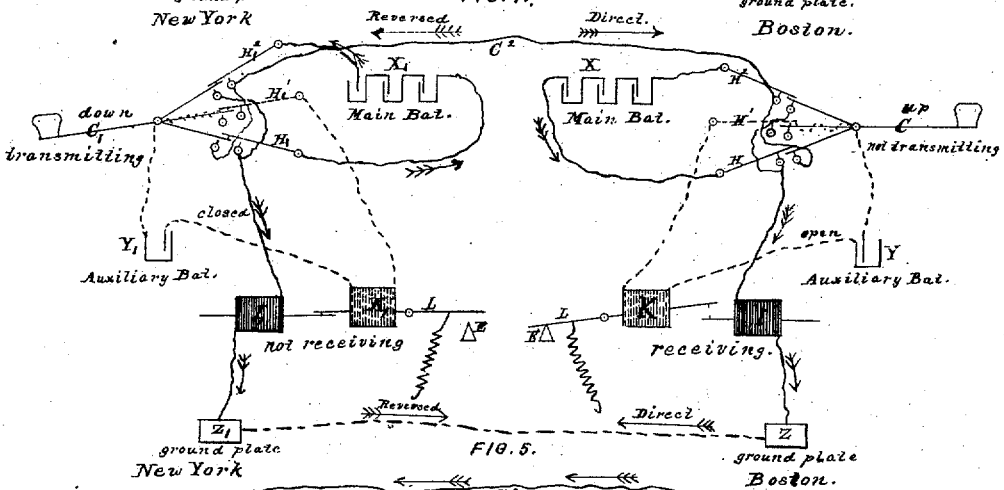
Figure 6:
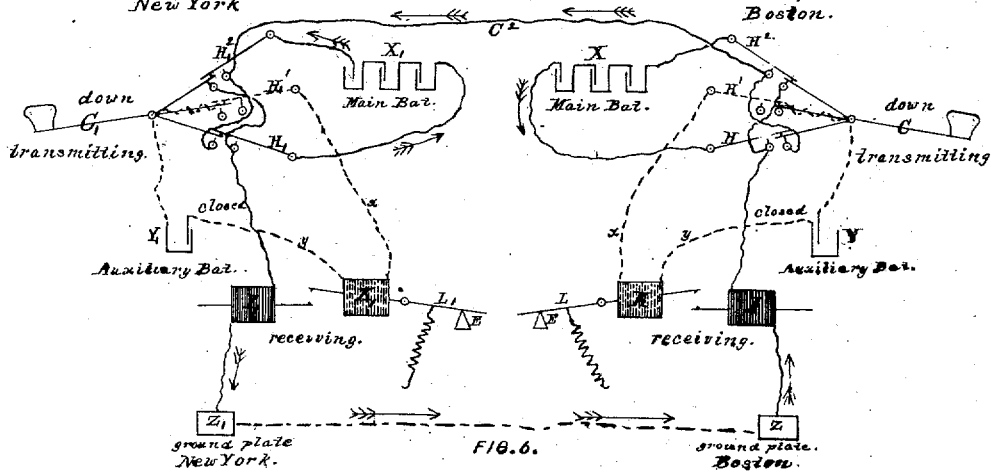
Figure 7:
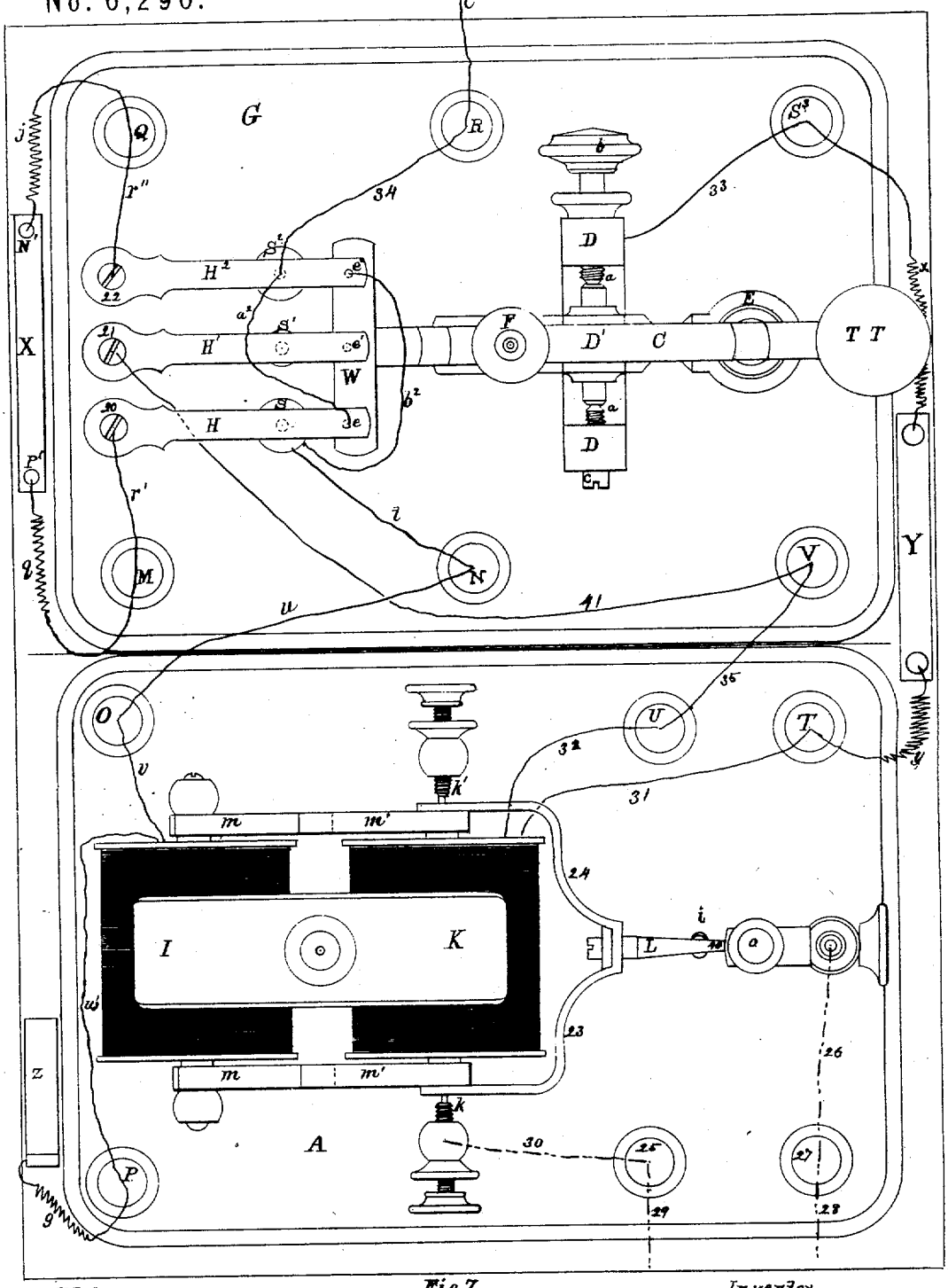

Of the drawings, Sheet 1 shows, in Figure 1, an elevation of the relay, in Fig. 2 an elevation of the key. Sheet 2, Fig. 3, shows a plan view of the relay and key, with their respective connections, at two terminal stations—as, for instance, New York and Boston. Sheet 3, at Fig. 4, shows a skeleton of the apparatus and connection at Boston and New York, neither instrument being in the act of transmitting. Fig. 5 exhibits New York as transmitting, and Boston as receiving, while Fig. 6 shows each station as both transmitting and receiving. Sheet 4, at Fig. 7, shows an enlarged plan view of both relay and key with their mutual connections.

I will first briefly describe the relay. It has two coils of wire, I and K, Fig. 1. The coil I is in the main circuit, the coil K in the accessory circuit. Each coil has a central core of soft iron, terminated at each end with arms $m$ $m^1$ of the same material. The ends of the arms are sloped at $l'''$, so that when in contact the iron cores with their arms form, as it were, a parallelogram. The core of the coil I is stationary; that of K is capable of being rotated through a small arc around its axis. To the core of K is attached a stirrup or yoke, 23 24, carrying an arm or lever, L 40. A spring, $i$, tends to depress the end 40 of the lever against the platinum-point $n$ of the screw $p$, while the attraction of the arms $m$ $m^1$ for each other, caused by a current of electricity in either or both of the coils I K, would lift the end 40 of the lever L against the insulated point $l$ of the screw $o$, of course stretching the spring $i$.

There are screw-cups P O U T 25 27 on the relay-platform for the purpose of making conveniently the proper connection with the telegraphic circuit with the key and with the batteries. One end of the wire composing the coil I is connected by wire $v$ to the screw-cup O, while the other end of the coiled wire is connected by $w'$ to cup P. This cup is connected by the ground-wire $g$ to the ground-plate Z. (See Fig. 7.) One end of the wire of the coil K is connected by 31 to cup T, while the other end is connected by 32 to cup U. The core of K is connected by 30 to cup 25, which receives the wire 29, leading to the local or register circuit. The cock supporting the screws $o$ and $p$ is connected by the wire 26 to the cup 27, which receives the wire 28, also leading to the local battery of the register-circuit. The cup T is connected by wire $y$ to one pole of the accessory battery Y. The cup U is connected by wire 35 to cup V on the key-platform. Likewise the cup O is connected by wire $u$ to the cup N on the key-platform.

The key (shown on an enlarged scale in Figs. 2 and 7) has a bent lever, C, like an ordinary telegraph-key. It has a thumb-piece, T T, an axis, $D^1$, supported in a cock, D; also, a small spring, $d$, to press it up from the anvil E until the back screw F rests on the base of the key-frame. In addition to this ordinary lever C there are one or more (in this instrument three) auxiliary levers, springs, or keys, H $H^1$ $H^2$, supported at 20 21 22, and tending normally to rest on screws, anvils, or supports S $S^1$ $S^2$, unless when raised by the points $e$ $e^1$ $e^2$ of screws $f$, which are inserted into the ivory bar W, which is rigidly attached to the hinder end of the independent key-lever C. The screw $f$ $e^2$ is in metallic connection with the key-lever C, but the screws $f$ $e$ and $f$ $e^2$ are insulated therefrom by the bar W of ivory or other insulating material. The key-platform G has on it the screw-cups M, N, V, $S^3$, R, and Q. The cup M is connected by the wire $q$ with the pole $P^1$ of the main battery X, while its other pole $N^1$ is connected by the wire $j$ to the cup Q. The cup M is connected by the wire $r'$ to the end 20 of the auxiliary lever H. The cup Q is connected by wire $r''$ to the end 22 of the auxiliary lever $H^2$. The anvil $S^2$ is connected by the short wire $a^2$ to the screw $f$ $e$; also, by wire 34, to the cup R. The anvil S is connected by wire $b^2$ to the screw $f$ $e^2$; also, by wire $t$, to the cup N. The supporting-cock D of the key-lever C is connected by wire 33 to cup $S^3$, and this, by wire X, to the other terminal of the accessory battery Y. The end 21 of the auxiliary lever $H^1$ is connected by wire 41 to the cup V, while the anvil $S^1$ is insulated. The cup R receives the main-line wire $C^2$.

I have thus minutely described the construction of the instruments, as exhibited in Figs. 1, 2, and 7.

I do not limit myself to the particular construction of either the relay or key as here described, but would use any other known form of either, so long as they should perform the same function in substantially the same manner.

I will now describe their proper arrangement and connection with a line of telegraph, referring therefor to Sheet 2, Fig. 3. In Fig. 3 the letters and figures on the New York instrument are the same as those on the Boston instrument, with the exception of having a subscript mark thus $_1$. $X_1$ represents the main battery at New York, while X represents the main battery at Boston; and there is this other difference that the poles of the main battery at New York are in a position the reverse of that at Boston. The screw-cups R and $R_1$ on the key-platforms at Boston and New York serve to receive the ends of the main-line wire $C^2$.

I will next trace out the course of the main circuit. When the keys C and $C_1$ are up, commencing at the ground-plate $Z_1$ at New York, its course is as follows: By wire $g_1$ to $P_1$, via wire $w_1$, coil $I_1$, wire $v_1$, cup $O_1$, wire $u_1$, to $N_1$ on key-platform; thence by $l_1$ to anvil $S_1$, via $H_1$, $20_1$, $r_1$, $M_1$, and wire $q_1$, to the cup $N_1^1$ of the New York main battery $X_1$. Emerging from $P_1^1$ it passes by wire $j_1$ to screw-cup $Q_1$; thence by wire $r_1''$ to the auxiliary lever $H_1^2$; thence to $S_1^2$, and by wire $34_1$ to the cup $R_1$, where it enters the main line $C^2$. Passing over it to the Boston instrument it enters at R. Passing by wire 34 to anvil $S^2$, thence by $H^2$, 22, $r''$, Q, and $j$, it enters the Boston main battery at $N'$. Emerging at $P'$, it goes by $q$ to M; thence by $r'$ to 20, along H to S; thence by wire $t$ to N; thence by $u$ to the relay at O. Here it enters the main-circuit coil I by the wire $v$. It emerges by $w$, goes to the cup P, and thence by wire $g$ to ground-plate Z, completing the circuit, via the earth, to New York.

It will be seen that the currents from both main batteries $X_1$ and X are in the same direction, and of course the electro-motive force active in the main circuit is that due to both the batteries $X_1$ and X, and is, therefore, equal to their sum.

It will be noticed, also, that the negative pole $N_1'$ of the New York battery is toward the earth, and the positive pole $P'$ of the Boston battery is to earth. Hence the main-circuit coils I and $I_1$ will be charged, and their cores magnetized, to an extent due to the strength of this main-circuit current, and to the number of turns of wire in each coil. Of course the arms $m\,m_1$ will become magnetized, attracting the arms $m'\,m_1'$, and tending to lift the levers L and $L_1$ against the force of the springs $i$ and $i_1$.

Suppose, now, the key $C_1$ at New York be depressed, as in Fig. 4, Sheet 3. The depression of the thumb-piece $T_1\,T_1$ will bring the screw-points $e_1\,e_1^1\,e_1^2$ against the auxiliary levers $H_1\,H_1^1\,H_1^2$ and lift them from their anvils $S_1\,S_1^1\,S_1^2$, closing the circuit of the auxiliary battery $Y_1$ at $e_1^1\,H_1^1$, reversing the direction of the current from the main battery $X_1$, putting its positive pole $P_1'$ to earth, so that the current from the battery $X_1$ will tend to neutralize that of the current from the main battery X; and if the two batteries be equal, and the line well insulated, will do so completely, so that the cores of $I_1$ and I will become demagnetized: but, since the accessory battery $Y_1$ has its circuit closed at $e_1^1\,H_1^1$, the coil $K_1$ will be charged, its core magnetized, and its arms $m_1'$ will attract the arms $m_1$, and prevent the lever $L_1$ from being drawn down by the spring $i_1$. Not so, however, with the lever L, because the coil K is not charged, the key C not having been depressed. Hence the lever L will drop, and thus give a sign that $C_1$ is depressed.

If, now, while $C_1$ is depressed, we should also depress C, we should reverse the direction of the current from the main battery X, and close the circuit of the accessory battery Y; and since, when the accessory circuit Y is closed, and the direction of the current from the main battery X reversed, the polarities $m$ and $m'$ are similar, of course L will drop, closing the local circuit of the register at 40 $n$.

It is the same with $m_1$ and $m_1'$. When the key $C_1$ is depressed, the direction of the current from $X_1$ tends to produce in $m_1$ a polarity similar to that produced in $m_1'$ by the closing of its accessory circuit $Y_1$.

The case where both keys are simultaneously depressed is shown at Fig. 6, Sheet 3.

I will now go back and trace the course of the current through the New York instrument when the key $C_1$ is depressed. None of the connections are changed except between $N_1$ and $R_1$. Starting from $N_1$, the circuit is, via $t_1$, to $S_1$. Since the depression of $C_1$ has lifted $H_1$ off from $S_1$ by the contact of $e_1$, the only alternative for the main circuit is by following along the short wire $b_1^2$ from S to $e_1^2$. There it enters $H_1^2$, goes, by $22_1$, $r_1''$, Q, and $j_1$, to the main battery $X_1$, which it enters at $P_1'$, emerges at $N_1'$, passes, by $q_1$, to $M_1$, thence, by $r_1'$, to $H_1$, which it enters at $20_1$, passes along to contact $e_1$; thence, by wire $a_1^2$, to $S_1^2$, and thence, by wire $34_1$, to $R_1$, where it enters the main line $C^2$.

It will thus be seen that the path of the main circuit is different when the key is depressed from what it is when the key is up. When the key $C_1$ is depressed, the short wires $a_1^2$ and $b_1^2$ are included in the main circuit; but as they may be made so short and large as to offer no resistance of any account, compared with the resistance of the whole circuit, the circuit resistance may be considered as practically equal in either position of the key. Another and vital point is worthy of notice. It is this: if the anvil-screws $S_1\,S_1^1\,S_1^2$ are properly adjusted with reference to the auxiliary levers $H_1\,H_1^1\,H_1^2$ and points $e_1\,e_1^1\,e_1^2$, the continuity of the main circuit remains unbroken during the manipulation of the key, for, though, at the instant when the points $e_1$ and $S_1$ are both in contact with the lever $H_1$, as also $e_1^2$ and $S_1^2$ with $H_1^2$, the main circuit is shortened by the cutting out of the main battery $X_1$, yet as this lasts only for an instant, its effect is not felt on the coil $I_1$ of the relay, especially if the internal resistance of the main battery $X_1$, including its leading wires $j_1$ and $q_1$, be of considerable magnitude, so as to prevent the appearance of much spark at the instant when $H_1$ and $H_1^2$ rise from $S_1$ and $S_1^2$.

It is manifest that, without departing from the principles of my invention, I may reverse the location of the screws $o$ and $p$, so that the insulated point shall be below the lever L; and also reverse the connections of the main battery at, say, Boston, so that its negative pole $N^1$ shall be to earth. Then, if the two main batteries be equal and the line well insulated, there will be a neutral current, so to speak, or rather there will be no current on the main line, and the coils I and $I_1$ will not be charged when the keys C and $C_1$ are up. But then the direction of the accessory battery connections at Boston must be reversed likewise, and it is easy to see that the instruments will work equally well in this manner, and there will be this advantage, when the instruments are not at work, that the consumption of materials in the main batteries will be lessened.

It is obvious that way-stations, provided only with instruments suited for single transmission, cannot hold double communication with either terminal station. Neither can a way-station, with ordinary instruments, understand what is passing between the terminal stations when both are transmitting, nor yet when one only is transmitting by the use of the double transmitter-key, because the way-station hears only a short break when the double transmitting-key is depressed or raised. But if a way-station should work his key in the ordinary manner both terminal stations will recognize his movements, and understand his writing, if both the main batteries be arranged in the manner first described, and if the points of the contact-screws $p$ and $o$ be arranged in the second manner described. Either terminal station can execute single transmission to the other terminal station, or to any way-station, by manipulating either of the auxiliary keys H or $H^2$ at Boston, or $H_1$ or $H_1^2$ at the New York station, as the manipulation of either H or $H^2$ singly simply opens and closes the main circuit, as is ordinarily done by a common make and break circuit key.

I have corrected, in Fig. 4, Sheet 3, of the drawings which accompany this amended specification, a slight error which occurs in all the copies which I have seen of the original patent. The original has been lost. The error is this: In Fig. 5 of the original drawings the dotted lines, which stand for the short wires $a^2$ $b^2$, are represented as not crossing each other, which they should do, as they do in Figs. 6 and 7—that is, the anvil S should be represented as connected, by the short wire $b^2$, to the point $e^2$ on the ivory bar of the key-lever C; also, the anvil $S^2$ should be represented as connected, by the wire $a^2$, to the point $e$. The error is manifestly the error of some copyist, as the proper mode of connection was correctly described in the original specification.

It will thus be seen that I have provided a means of preserving the continuity of the main circuit during the manipulation of the key by closing one branch or path for the main circuit, that was previously open, at the same time or slightly before opening another branch or path that was previously closed, as, for instance, closing the path $N_1$ $t_1$ $S_1$ $b_1^2$ $e_1^2$ $H_1^2$ $j_1$ $P_1$ $N_1^1$ $q_1$ $M_1$ $r_1^1$ $H_1$ $e_1$ $a_1^2$ $34_1$ $R_1$ at the same time or slightly before opening at $S_1$ $H_1$ $S_1^2$ $H_1^2$ the previously-closed path $N_1$ $t_1$ $S_1$ $H_1$ $r_1$ $M_1$ $q_1$ $N_1^1$ $P_1^1$ $j_1$ $Q_1$ $H_1^2$ $S_1^2$ $34_1$ $R_1$, and vice versa, when the key $C_1$ is let up.

Hence I claim—

1. The combination, with a double transmitter, of a device which shall preserve the continuity of the main circuit, by closing one branch or path thereof, which was previously open, at the same time or slightly before that it opens another branch or path that was previously closed.

2. The combination of such a continuity-preserving device with an equating circuit which shall hinder the associate relay or other receiving-instrument from responding to the action of this transmitting key or device, unless assisted by the action of some other independent transmitting device.

3. In combination with instruments for sending and receiving messages simultaneously upon one wire, a key or device, arranged to transmit signals by reversing the direction of the main-battery current, without interrupting the continuity of the main circuit.

4. The combination of a continuity-preserving key with a battery for transmitting signals to a distant station, and a relay or receiving-instrument for receiving signals at the same time, from a distant station.

5. In instruments for the simultaneous transmission and reception of messages over one wire, the combination, at each station, of an accessory magnet or coil, an accessory battery, the necessary main-circuit magnets, and batteries with the means of reversing the direction of the current of each of the main batteries, substantially as set forth.

MOSES G. FARMER.

Witnesses:
SARAH J. FARMER,
CHARLES STOWELL.